(12) United States Patent
Payne et al.

(10) Patent No.: US 10,696,403 B2
(45) Date of Patent: Jun. 30, 2020

(54) AIRCRAFT MONUMENT FLOOR MOUNTING SYSTEM

(71) Applicant: B/E Aerospace, Inc., Wellington, FL (US)

(72) Inventors: Elizabeth M. Payne, Rowesham (GB); Merv Davidson, Wellington, FL (US)

(73) Assignee: B/E Aerospace, Inc., Winston-Salem, NC (US)

(*) Notice: Subject to any disclaimer, the term of this patent is extended or adjusted under 35 U.S.C. 154(b) by 130 days.

(21) Appl. No.: 15/648,165

(22) Filed: Jul. 12, 2017

(65) Prior Publication Data

US 2018/0016008 A1 Jan. 18, 2018

Related U.S. Application Data

(60) Provisional application No. 62/361,460, filed on Jul. 12, 2016.

(51) Int. Cl.
| | | |
|---|---|---|
| *B21D 53/92* | (2006.01) | |
| *B64D 9/00* | (2006.01) | |
| *B64F 5/00* | (2017.01) | |
| *F16B 5/00* | (2006.01) | |
| *F16B 5/02* | (2006.01) | |

(52) U.S. Cl.
CPC ............ *B64D 9/003* (2013.01); *B21D 53/92* (2013.01); *B64F 5/00* (2013.01); *F16B 5/0088* (2013.01); *F16B 5/0225* (2013.01); *Y10T 403/75* (2015.01)

(58) Field of Classification Search
CPC ........ B21D 53/90; B21D 53/92; B64D 9/003; B64D 11/00; B64D 11/0007; B64D 11/003; B64D 11/0696; B64D 2011/0046; B64F 5/00; F16B 5/0088; F16B 5/02; F16B 5/0216; F16B 5/0225; F16B 5/0233; F16B 9/026; F16B 9/054; F24C 15/30; F25D 23/10; Y10T 403/75
USPC ...................................................... 403/408.1
See application file for complete search history.

(56) References Cited

U.S. PATENT DOCUMENTS

| | | | |
|---|---|---|---|
| 4,418,901 A | 12/1983 | Woods et al. | |
| 5,060,920 A | 10/1991 | Engibarov | |
| 5,520,357 A * | 5/1996 | Payne ............... | B61D 45/006 244/118.1 |

(Continued)

FOREIGN PATENT DOCUMENTS

| | | | | |
|---|---|---|---|---|
| DE | 202014007350 U1 | * | 10/2014 | .............. F16B 5/025 |
| FR | 3029162 A1 | * | 6/2016 | .............. B60R 9/04 |

*Primary Examiner* — Josh Skroupa
(74) *Attorney, Agent, or Firm* — Suiter Swantz pc llo

(57) ABSTRACT

A system for mounting an aircraft monument partition to an aircraft cabin surface such as a floor may include a mounting structure fitted within and attached to a floor-abutting edge of the monument partition, the mounting structure including a mounting opening. A securement apparatus for securing the monument partition to cabin surface via the mounting structure may include a threaded fastener for extending through the mounting opening of the mounting structure and through a corresponding opening in a track mounted to the cabin surface, and a bridging washer for mating with the mounting opening; where, to secure the monument partition to the floor of the cabin area, the threaded fastener is provided through the mounting opening of the mounting structure and threaded to a mating fixture on a bottom side of the track.

17 Claims, 10 Drawing Sheets

(56) References Cited

U.S. PATENT DOCUMENTS

| | | | |
|---|---|---|---|
| 6,126,158 A | 10/2000 | Engibarov | |
| 7,374,131 B2* | 5/2008 | Tiid | B64D 9/003 |
| | | | 244/118.5 |
| 8,701,221 B2* | 4/2014 | Topcu | E03D 1/26 |
| | | | 4/417 |
| 9,822,808 B2* | 11/2017 | Rajeev | F16B 37/044 |
| 9,929,482 B2* | 3/2018 | Van Ceulen | F16B 5/0241 |
| 9,994,299 B2* | 6/2018 | Aske | B64C 1/10 |
| 2010/0308190 A1* | 12/2010 | Tkocz | B64D 11/04 |
| | | | 248/222.14 |
| 2011/0179626 A1 | 7/2011 | Weber et al. | |
| 2016/0288896 A1 | 10/2016 | Aske et al. | |
| 2017/0335869 A1* | 11/2017 | Bui | F16B 2/005 |
| 2018/0216644 A1* | 8/2018 | Mateo | B64F 5/10 |

\* cited by examiner

AIRCRAFT MONUMENT FLOOR MOUNTING SYSTEM

CROSS-REFERENCE TO RELATED APPLICATION

This application claims priority from U.S. Provisional Application No. 62/361,460, filed Jul. 12, 2016, the contents of which are incorporated by reference in their entirety.

BACKGROUND

The present disclosure relates to mounting monument systems, such as galley monuments, lavatory monuments, storage monuments, and other structures, within a commercial aircraft cabin by securing the monument system to a cabin floor.

It is desirable for monument structures to be releasably mounted within an aircraft cabin, for example, to provide for reconfiguration of the cabin layout by releasing and relocating monument structures. However, it is also important that the monument structures, upon mounting, be rigidly maintained in position such that the structures are able to sustain industry static and dynamic load requirements.

Federal regulations dictate certain standards for static load handling and dynamic load handling. 14 CFR 25.561 (incorporated herein by reference) provides that aircraft structures such as bulkheads must be able to withstand a 9G forward static load. It is understood in the industry that if structures are spaced within one inch of one another, it must be demonstrated that the structures are capable of sharing loads during normal use and emergency landing conditions.

SUMMARY OF ILLUSTRATIVE EMBODIMENTS

The forgoing general description of the illustrative implementations and the following detailed description thereof are merely exemplary aspects of the teachings of this disclosure, and are not restrictive.

In an illustrative embodiment, a system is provided for mounting an aircraft monument to a floor of a cabin area of an aircraft, including a monument partition; a mounting structure fitted within and attached to a floor-abutting edge of the monument partition, the mounting structure including a mounting opening; and a securement apparatus for securing the monument partition to the floor of the cabin area via the mounting structure, the securement apparatus including a threaded fastener for extending through the mounting opening of the mounting structure and through a corresponding opening in a floor track mounted to the floor of the cabin area, and a bridging washer for mating with the mounting opening; where, to secure the monument partition to the floor of the cabin area, the threaded fastener is provided through the mounting opening of the mounting structure and threaded to a mating fixture on a bottom side of the floor track.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
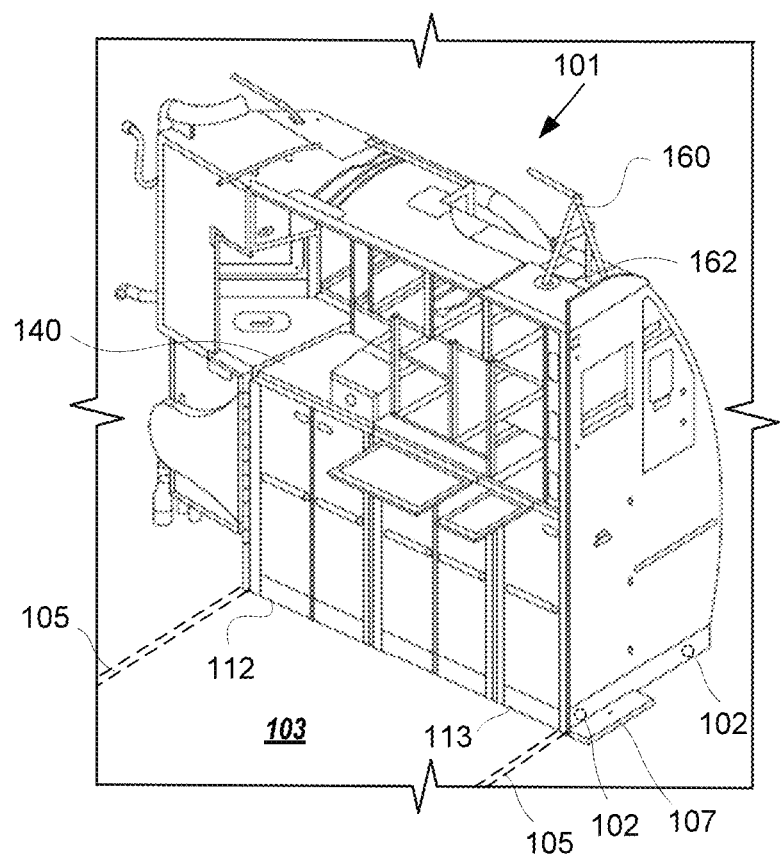
FIG. 1 illustrates a galley monument according to an example.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom,"

"front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

FIG. 1 is a perspective view of a section of an aircraft galley monument 101 connected to a section of floor 103, according to an example embodiment. The galley monuments may be positioned with a longitudinal axis perpendicular to a longitudinal axis of the aircraft, and the galley monument may be positioned with a longitudinal axis parallel to the longitudinal axis of the aircraft. The galley monument 101 may be positioned above the floor 103 and secured to the aircraft by a variety of securement systems 130, further described by FIG. 4-FIG. 12, at various attachment points 102 on the floor 103 of the aircraft. In some implementations, the floor 103 may have one or more tracks 105 allowing securement of the galley monument 101 to the aircraft.

In some examples, the galley monuments are further secured to the aircraft by at least one upper galley attachment 160. Each upper galley attachment 160 may be connected to an upper attachment point 162 to form a triangulated joint with the galley monument that supplements connections between the lower attachment points 102 and the lower mounting positions of the galley monument secured by one or more of the securement systems 130. In some examples, the upper galley attachment 160 may be connected to at least two points on the galley monument and at least one point on the aircraft in a triangulated manner. In other examples, the upper galley attachment 160 may be connected to at least one point on the galley monument and at least two points on the aircraft in a triangulated manner. In some implementations, an elongated floor support 107 in a longitudinal axis parallel to a direction of flight of the aircraft can be used to limit lateral movement of the galley monument 101.

Figure 2A:
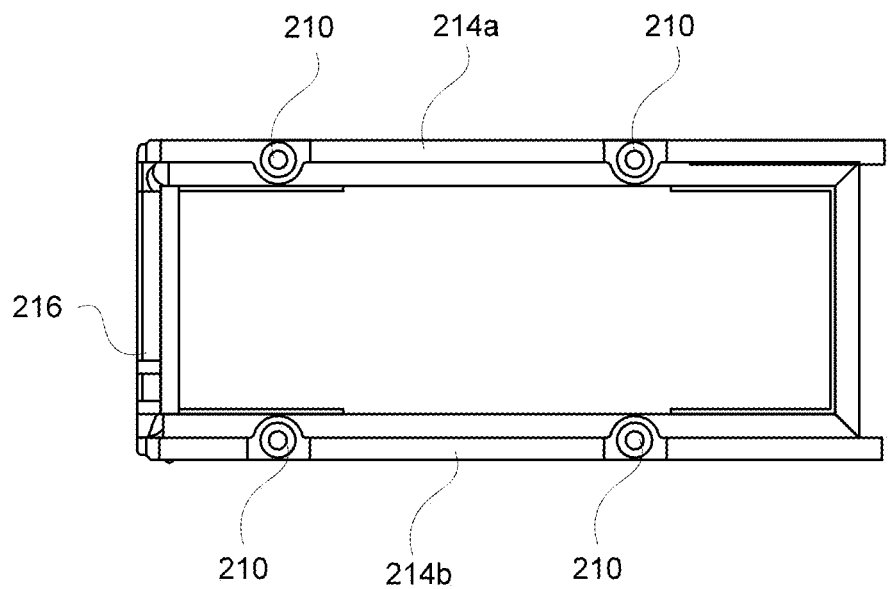
FIG. 2A illustrates a bottom view of a portion of a galley monument including a first monument wall, a second monument wall, and a number of securing locations on an aircraft floor, according to an example.
Figure 2B:
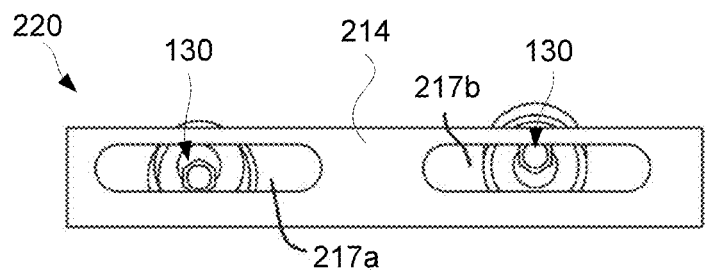
FIG. 2B illustrates a bottom surface of a monument wall having a dual securing location including a number of elongate apertures, each elongate aperture configured to receive a securement system, according to an example.

FIG. 2A illustrates a bottom view of a portion of a galley monument including a first monument wall 214a, a second monument wall 214b, and a number of securing locations 210. The monument wall 214a and the monument wall 214b can be connected by a compartment door 216 and/or a work surface 140 according to an example. In some implementations, in place of a single securing location 210, a bottom surface of the monument wall 214 can have a dual securing location 220 include a number of elongate apertures 217a-b, each which are secured to the floor 103 with a securement system 130 (See FIG. 2B).

Figure 3A:
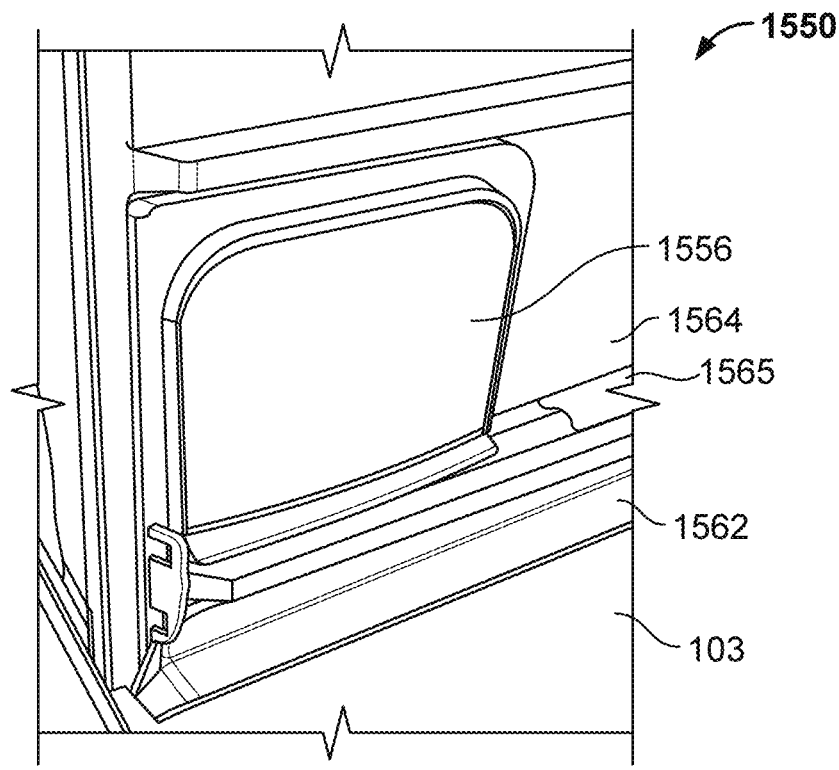
FIGS. 3A-3B represent perspective views of a monument mounting system, according to example embodiments.
Figure 3B:
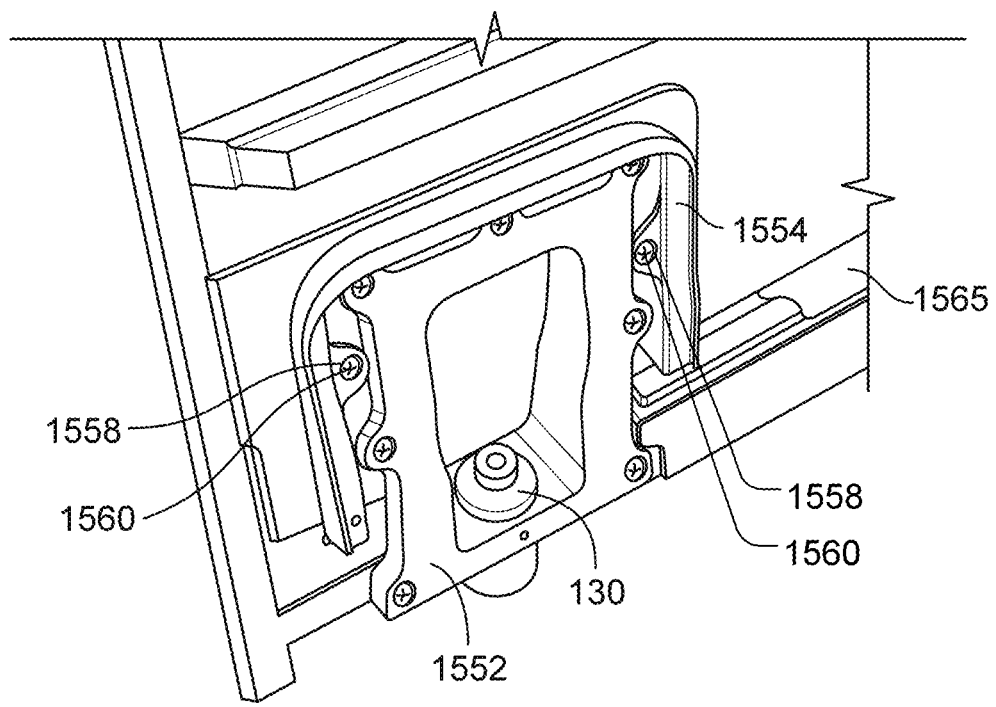

The galley monument 101 may be equipped with a galley mounting system 1550 and be secured to the aircraft floor 103 by the galley mounting system 1550. (See FIG. 3A). In one example, the galley monument 101 includes at least one of a trolley bay 112 and a chilled trolley bay 113. In an aspect, the galley mounting system 1550 is configured to maintain thermal isolation between galley monuments as well as with the cabin.

Figure 3C:
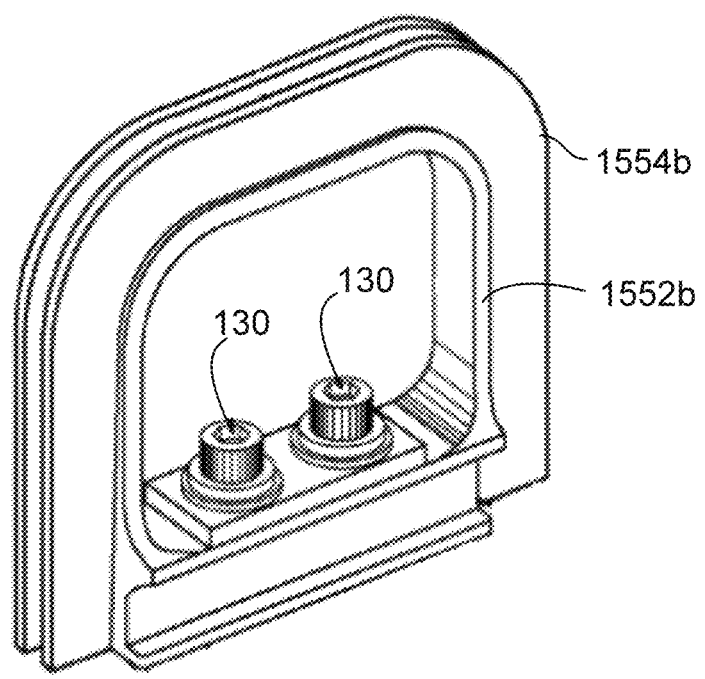
FIG. 3C illustrates a floor fitting cover frame connected to a mounting structure configured to attach to the floor with a number of securement systems according to an example.

FIGS. 3A-3E represent perspective views of a monument mounting system 1550, according to example embodiments. The monument mounting system 1550, in some implementations, is designed to secure and seal a monument such as a galley monument 101 to the aircraft floor 103. At least one end of the monument includes a monument wall or partition (illustrated here as wall 1564) positioned around a floor fitting cover frame 1554. The floor fitting cover frame 1554 may be secured to the floor 103, for example, by a mounting structure 1552 and a securement system 130. FIG. 3C illustrates a floor fitting cover frame 1554b connected to a mounting structure 1552b configured to attach to the floor 103 with a number of securement systems 130 according to an example.

A floor fitting cover 1556 may connect to the floor fitting cover frame 1554 to seal an interior of the monument. In an aspect, use of the floor fitting cover 1556, in some examples, may function to prevent air leaks and reduce thermal losses while allowing repeated access to the mounting structure 1552 and the securement system 130 for installation, maintenance, and inspection. The floor fitting cover frame 1554 may include at least one connection point 1558 positioned around a perimeter of the floor fitting cover frame 1554. The floor fitting cover 1556 may include at least one corresponding connection apparatus 1560 to connect with the at least one connection point 1558.

In one example, the at least one connection point 1558 may be a bore hole and the at least one connection apparatus 1560 may be a self-tapping fastener. In another example, the at least one connection point 1558 and the at least one connection apparatus 1560 may be matching snap fittings. In another example, the at least one connection point 1558 may be a threaded hole and the at least one connection apparatus 1560 may be a bolt or screw. A removable floor seal 1562 may be connected to the underside of the wall 1564 along a length of the wall 1564, between the wall 1564 and the floor 103 to further seal the monument. In an example, the floor seal 1562 can be configured to releasably seal to a floor seal mating structure 1565 presented along a bottom edge of the wall 1564.

In one example, at least one of the floor fitting cover frame 1554, the floor fitting cover 1556, and the floor seal 1562 may be formed at least in part from vacuum formed plastic. A portion of the floor fitting cover 1556 and/or a portion of the floor seal 1562, such as an edge, may include a flexible material for sealing the connection. In some examples, the flexible material may include silicone or rubber.

Figure 3D:
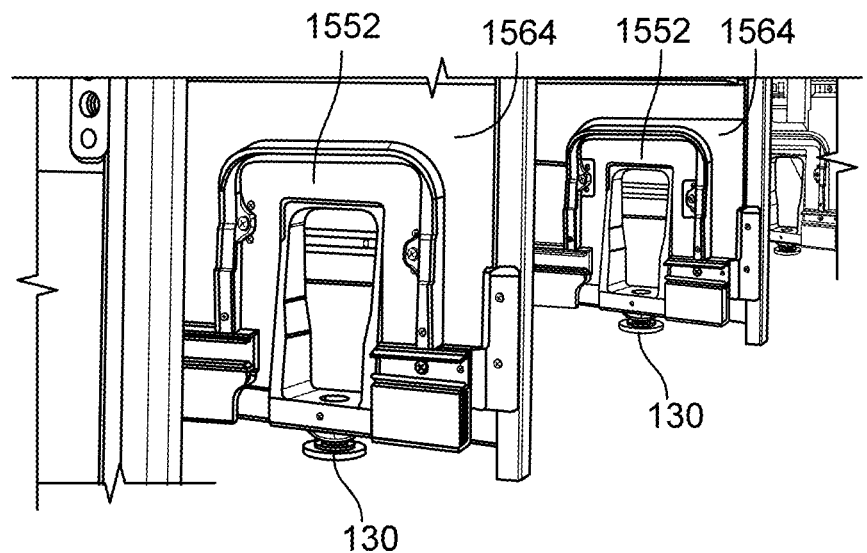
FIGS. 3D-3E represent perspective views of multiple monument mounting systems, according to example embodiments.

FIG. 3D illustrates a number of monument mounting systems 1550, each having at least one mounting structure 1552 and one securement system 130 connecting various partitions or walls 1564 of a monument to a surface, such as an aircraft floor. The securement system 130 may have at least one eccentric bushing allowing adjustment of the mounting structure 1552 along at least one of the x, y, and z directions.

The mounting structure 1552 may provide access to the securement system 130 from more than one side. In some cases, access to the securement system 130 may still effectively only be from one side, depending on placement or location of other equipment near the mounting structure 1552, for example, another monument or galley may hinder access. While the mounting structure 1552 and associated components may be designed to withstand forces in a case where the monument gallery is fully loaded with the weight of trolleys, equipment, and supplies, the mounting structure 1552 may also be used to secure lavatories and other, structures that may be subject to less force and require less strength to secure.

Figure 3E:
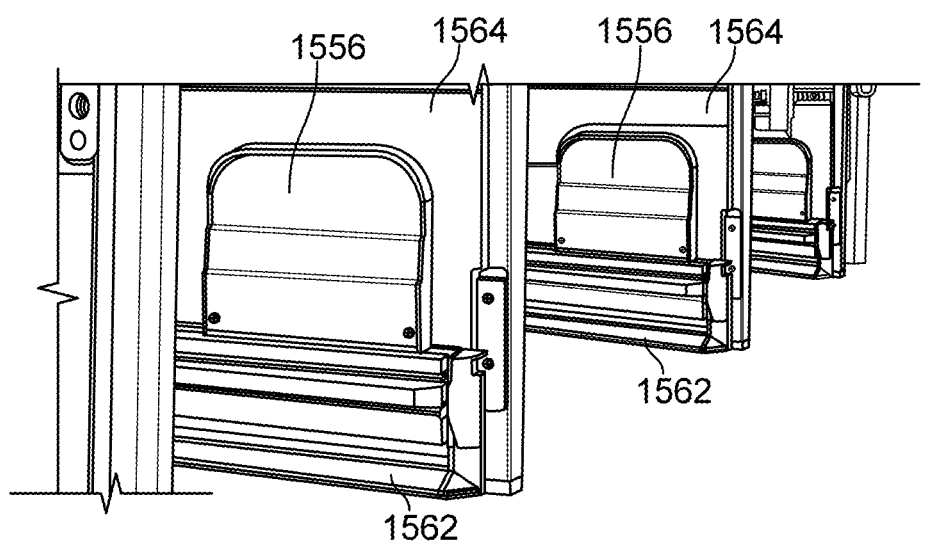

FIG. 3E illustrates the monument walls 1564 of FIG. 3D with floor fitting covers 1556 and floor seals 1562 installed on the monument walls 1564 to cover the mounting structure 1552 and the securement system 130. The floor fitting covers 1556 may be positioned to join, intersect, or cover at least a portion of the floor seals 1562 to enclose any mounting structure 1552 and securement system 130 for aesthetic and air flow purposes.

In an example, a method of sealing and insulating aircraft galley lower floor attachments using a removable floor fitting cover 1556 may include steps of connecting a monument wall 1564 to a floor fitting cover frame 1554 and a floor 103 with a monument mounting system 1550, attaching the floor fitting cover 1556 to the floor fitting cover frame 1554, and covering the monument mounting system 1550 and the floor fitting cover frame 1554 with a floor fitting cover 1556. The method may also include a step of placing a floor seal 1562 between base of the monument partition or wall 1564 and the floor 103.

Figure 4:
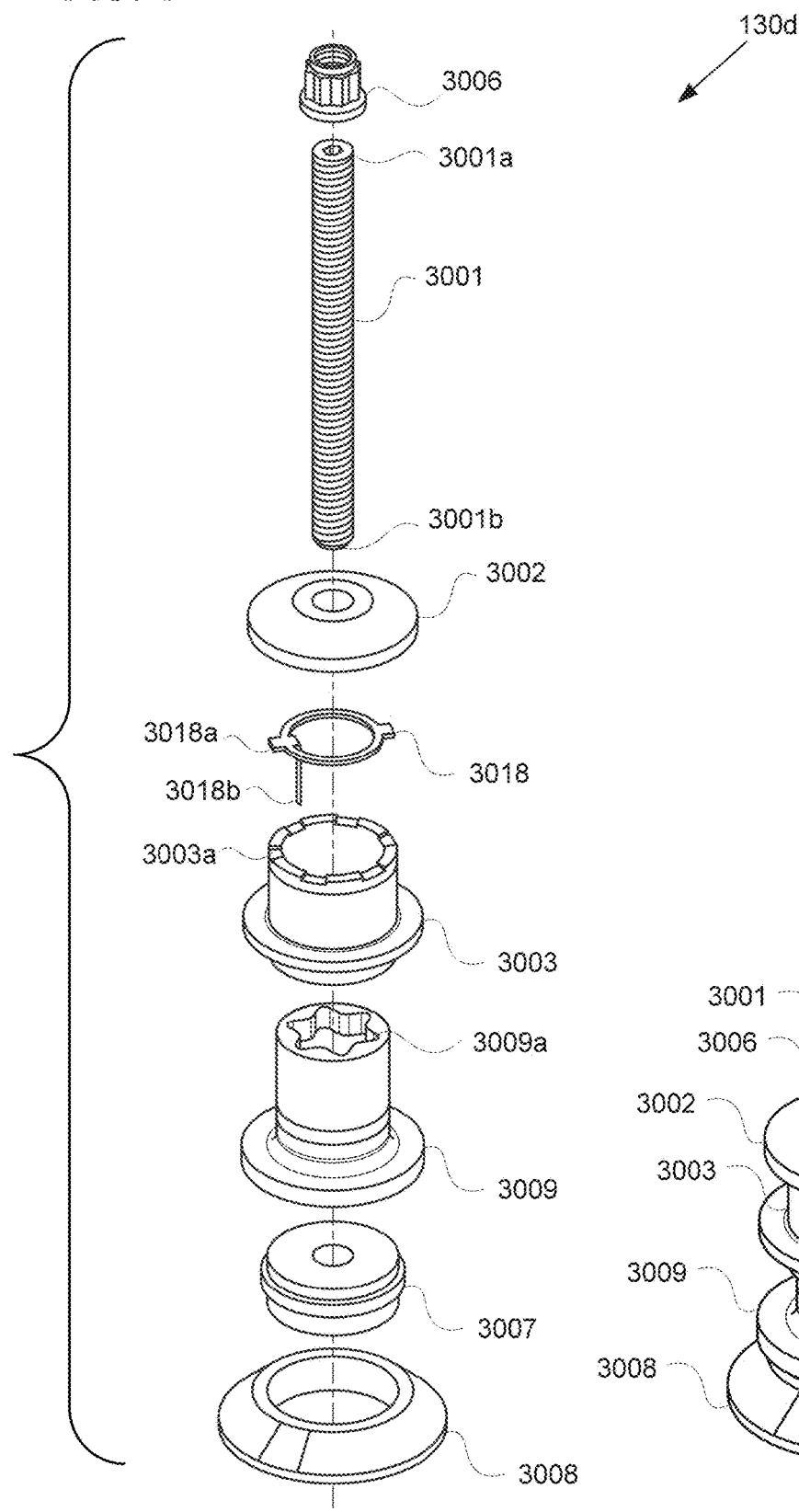
FIG. 4 is an exploded view of a securement system, according to an example embodiment.
Figure 5:
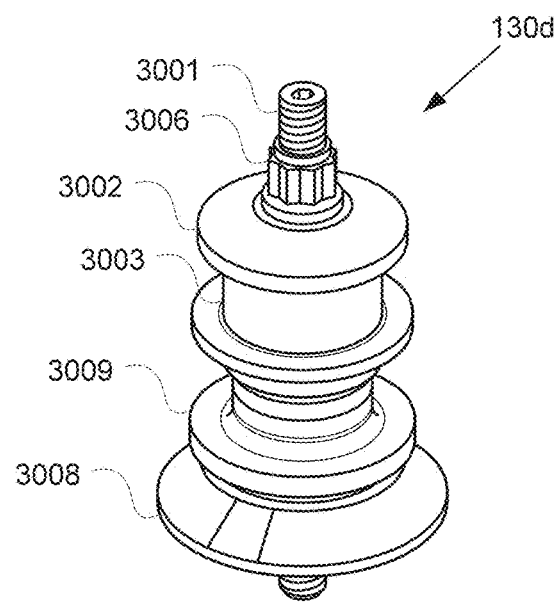
FIG. 5 is an assembled view of the securement system depicted by FIG. 4, according to an example embodiment.
Figure 11:
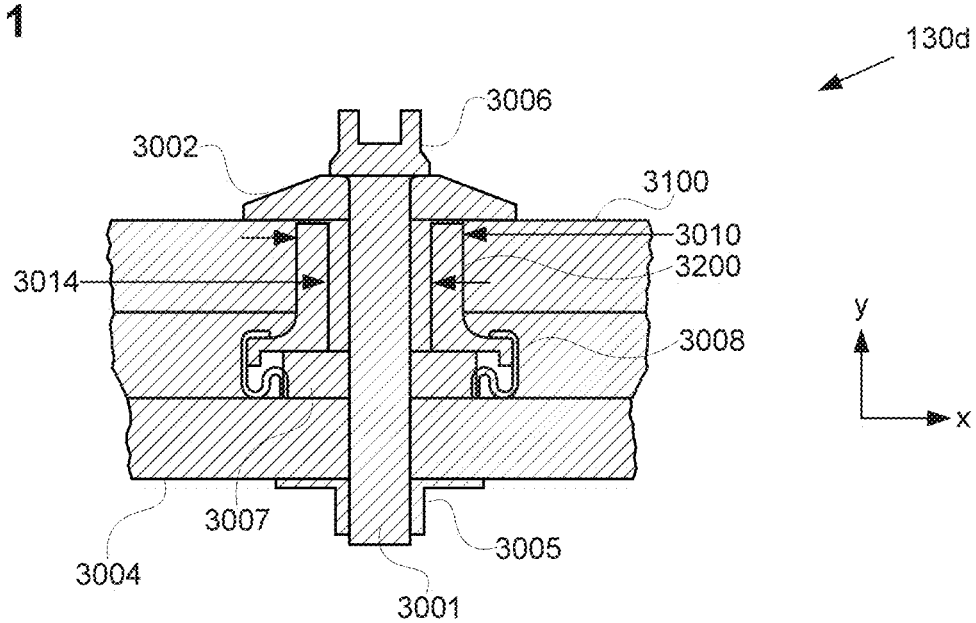

FIG. 4 illustrates an exploded view of a securement system 130*d*, according to an example embodiment. The securement system 130*d* is also illustrated by FIGS. 5 and 11. The securement system 130*d*, in some embodiments, includes a threaded fastener 3001 positioned within a bridging washer 3002, a threaded sleeve 3009, a cap spacer 3007, and a seal 3008. As shown, the securement system 130*d* is being used to secure a threaded insert or internal sleeve 3003. In other embodiments, other components can be secured by the securement system 130*d*. A first end 3001*a* of the threaded fastener 3001 may be connected to a bolt head 3006 while a second end 3001*b* of the threaded fastener 3001 may be connected to a nut 3005 (not shown) or other mating component.

The internal sleeve 3003, in some implementations, represents a part of a monument or panel secured to the aircraft. The threaded sleeve 3009 may be externally threaded and configured to be fitted inside the internal sleeve 3003 by a threaded connection or interference fit. In an example, both the internal sleeve 3003 and the threaded sleeve 3009 may be configured to fit within a mounting hole 3010 of a first assembly 3100 (see FIGS. 8-12).

Figure 6:
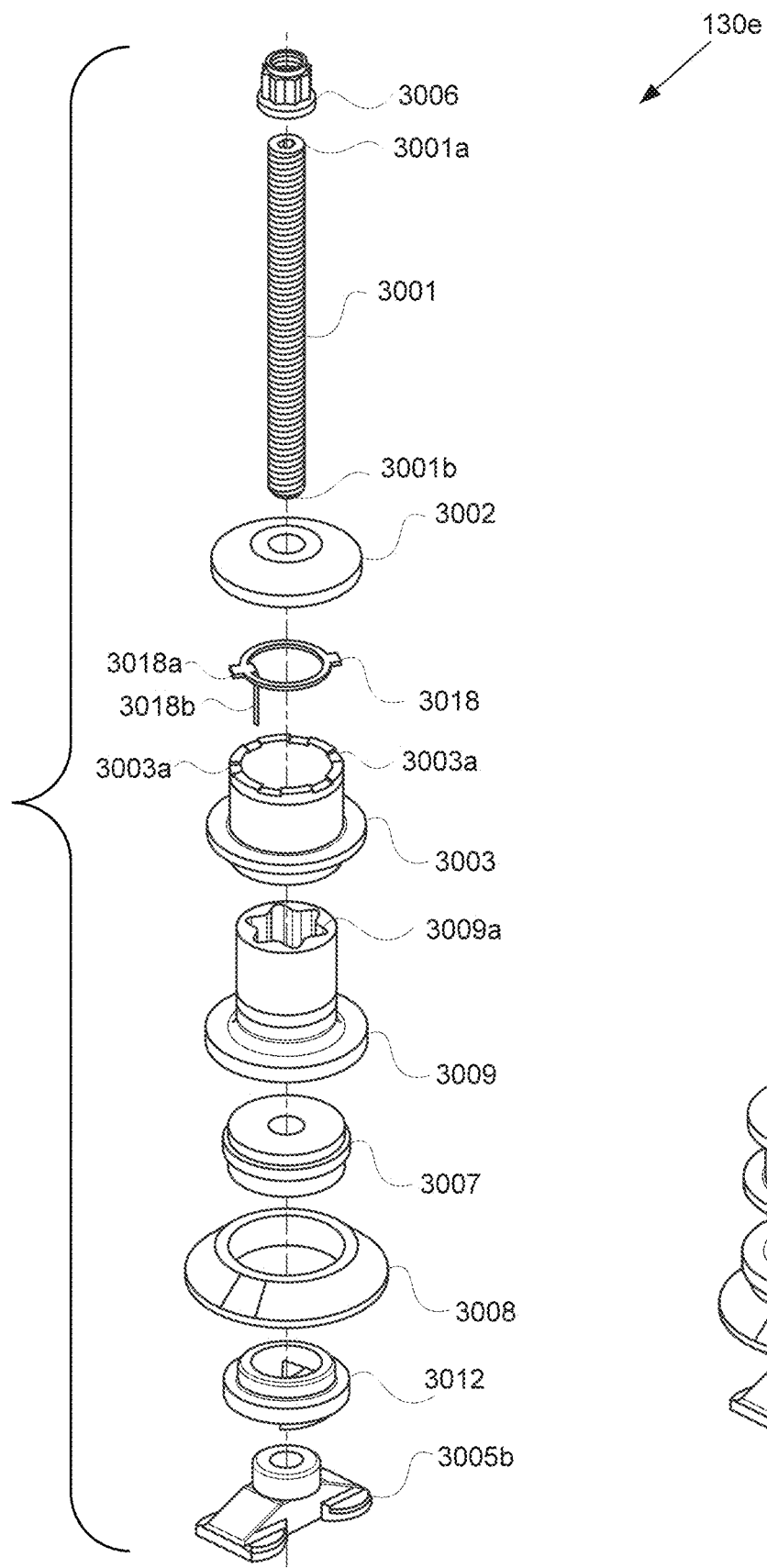
FIG. 6 is an exploded view of a securement system, according to another example embodiment.

A star-shaped fastener head 3009*a* on the threaded sleeve 3009, such as that shown in FIGS. 4 and 6, may offer a different maximum torque that can be applied to the threaded sleeve 3009, compared to the maximum torque that could be applied with a different type of head of the same size. A maximum torque a fastener is capable of receiving depends on a geometry of the head and a depth of the indentation, among other factors. Cases where a lower maximum torque may be desired include those involving use of materials with low yield strengths or where a high degree of precision is needed to prevent damage to various components due to overtightening of the fastener. Further, various tool patterns may allow faster adjustment of the fastener through easier access and adjustment of the tool relative to the head, while use of specialized or non-standard fasteners may also improve tamper-resistance somewhat by necessitating use of tools that may not be common or widely available. An axial position of the threaded sleeve 3009 relative to the internal sleeve 3003 may be adjusted, for example, through rotation of the threaded sleeve 3009 using an adjustment tool 4000 with a matching profile. In an example, adjustment tool 4000 can be used to secure and adjust a distance between the internal sleeve 3003 and the threaded sleeve 3009.

Figure 13:
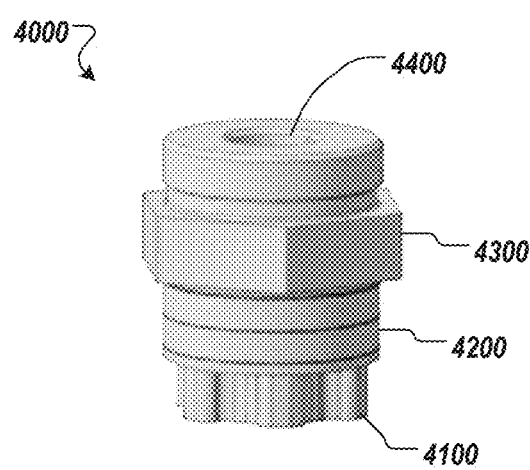
FIG. 13 illustrates an adjustment tool configured to adjust various securement systems described herein, according to an example.

FIG. 13 illustrates an adjustment tool 4000 with a first end 4100 having a matching profile to the star-shaped fastener head 3009*a* on the threaded sleeve 3009 and an extension 4200 having a width and length configured to fit within the internal sleeve 3003 according to an example. In an example, the extension 4200 can be connected to a head 4300 configured to allow for a proper amount of torque for rotation of the threaded sleeve 3009. In another example, the extension 4200, opposite the first end 4100, can have a socket opening 4400 configured to accept a complementary socket, hex key, or Allen wrench to allow for a proper amount of torque for rotation of the threaded sleeve 3009.

A lock washer 3018, in some implementations, is inserted during assembly to prevent rotation of the internal sleeve 3003 relative to the threaded sleeve 3009 and the bridging washer 3002. The lock washer 3018 may be used in embodiments of securement assemblies described in relation to FIGS. 8-12 though it may not be shown. While the nut 3005 is not shown in FIGS. 4-7, it is illustrated by FIGS. 8-11 and may be connected to a second end 3001*b* of the threaded fastener 3001 opposite a first end of the threaded fastener 3001 where the bolt head 3006 is positioned. Rotational adjustment of the bolt head 3006 and the nut 3005 increases or decreases axial tension in the threaded fastener 3001, allowing adjustment of a clamping or friction force between the internal sleeve 3003 and components connected to the first assembly 3100. In this example, the bolt head 3006 is a separate component from the threaded fastener 3001. In another example, the bolt head 3006 may be a fixed portion of the threaded fastener 3001.

FIG. 5 is perspective view of the securement system 130*d* depicted by FIG. 4, according to an example embodiment. The securement system 130*d* is shown assembled and includes the threaded fastener 3001 positioned within the bridging washer 3002, the threaded sleeve 3009, the cap spacer 3007, and the seal 3008. As shown, the securement system 130*d* is being used to secure a portion of the monument. In other embodiments, other components can be secured by the securement system 130*d*. A first end 3001*a* of the threaded fastener 3001 may be connected to the bolt head 3006 while a second end 3001*b* of the threaded fastener 3001 may be connected to the nut 3005 (FIGS. 8-11) or other mated component.

Figure 7:
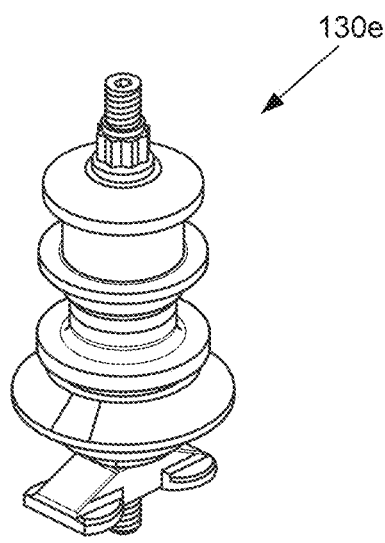
FIG. 7 is an assembled view of the securement system depicted by FIG. 6, according to the example embodiment.
Figure 12:
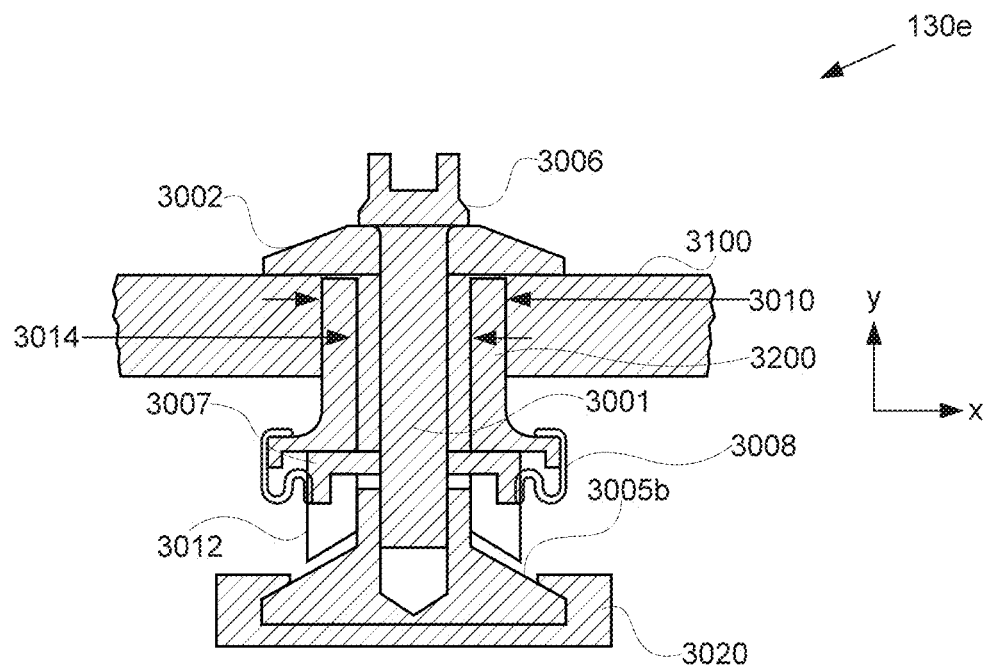

FIG. 6 is an exploded view of a securement system 130*e*, according to an example embodiment. The securement system 130*e* is also illustrated by FIGS. 7 and 12. In some embodiments, the securement system 130*e* includes the threaded fastener 3001 positioned within the bridging washer 3002, the first assembly 3100, the threaded sleeve 3009, the cap spacer 3007, the seal 3008, and a washer 3012. A first end of the threaded fastener 3001 may be connected to a bolt head 3006 while a second end of the threaded fastener 3001 is connected to a track fitting 3005*b*. The track fitting 3005*b* may allow a position of both the first assembly 3100 (or other secured component) and the securement system 130*e* to be adjusted by loosening the bolt head 3006, sliding both the first assembly 3100 and the securement system 130e along a horizontal axis of the track 3020, as illustrated by FIG. 12, and then tightening the bolt head 3006.

The lock washer 3018, in some implementations, is inserted during assembly to prevent rotation of the internal sleeve 3003 relative to the threaded sleeve 3009 and the bridging washer 3002. In an example, the lock washer 3018 can have one or more tabs 3018a configured to secure within a groove 3003a of the internal sleeve 3003 and an extension 3018b configured to secure within the star-shaped fastener head 3009a on the threaded sleeve 3009. The lock washer 3018 may be present in FIGS. 8-12 though it may not be shown. The track fitting 3005b may be connected to a second end of the threaded fastener 3001 opposite a first end of the threaded fastener 3001 where the bolt head 3006 is positioned.

Rotational adjustment of the bolt head 3006 and the track fitting 3005b increases or decreases axial tension in the threaded fastener 3001, allowing adjustment of a clamping or friction force between the internal sleeve 3003 and components connected to the first assembly 3100. In this example, the bolt head 3006 is a separate component from the threaded fastener 3001. In another example, the bolt head 3006 may be a fixed portion of the threaded fastener 3001.

FIG. 7 is perspective view of the securement system 130e depicted by FIG. 6, according to an example embodiment. The securement system 130e is shown assembled.

FIGS. 8-12 are side section views of securement systems 130a-d used to secure a first assembly 3100 including components which may be threaded and are fixed in relation to the monument to a second assembly 3004 including non-threaded components which are fixed to the aircraft and are used to support the monument, according to example embodiments. In an example, the first assembly 3100 may include one or more of a monument portion, a fitting attached to the monument, and the internal sleeve 3003. In an example, the second assembly 3004 may include one or more of an aircraft frame, a spacer on the track or seat rail fixing, and a washer such as the washer 3012.

Figure 8:
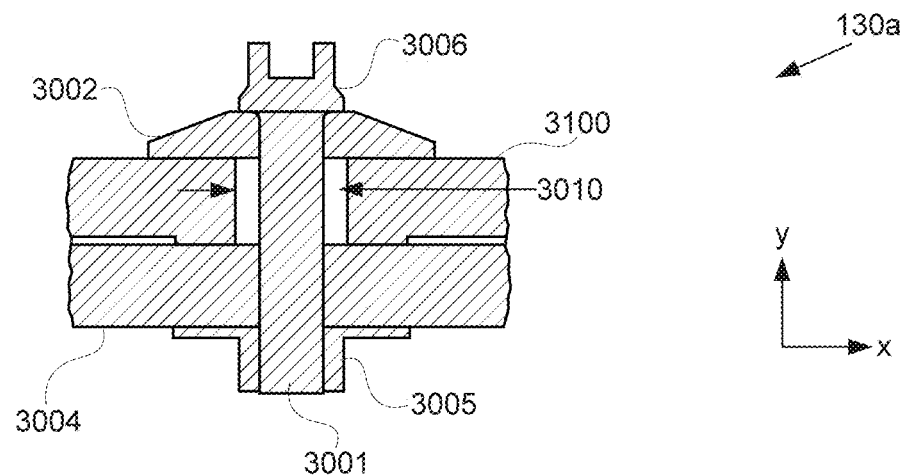
FIGS. 8-12 illustrate side section views of illustrative embodiments of securement systems, according to various example embodiments.

FIG. 8 is side section view of a securement system 130a used to secure the first assembly 3100 to the second assembly 3004, according to an example embodiment. The securement system 130a, in some implementations, includes the threaded fastener 3001, the bridging washer 3002, and the nut 3005. The threaded fastener 3001 may include the bolt head 3006 connected to a first end of the threaded fastener 3001. The bolt head 3006 may be a fixed portion of the first end of the threaded fastener 3001, in which case the bolt head 3006 and the threaded fastener 3001 may be designed to move together (within an elastic range of stress deformation) when adjusted. In some embodiments, the bolt head 3006 is a separate component, for example, a nut, that is threaded onto the first end of the threaded fastener 3001. Use of a nut on a threaded fastener 3001 may provide greater precision when applying a torque to the nut during assembly. Such a process may only stress the threaded fastener 3001 in tension in an axial direction instead of also applying torsion to a threaded portion of a bolt as a bolt head is tightened. More precise torque values may be applied to a threaded fastener 3001 with a separate nut than to a bolt head.

The bolt head 3006, in some implementations, is in contact at a first end of the threaded fastener 3001 with a first surface of the bridging washer 3002, and a second surface of the bridging washer 3002 is in contact with a first surface of the first assembly 3100. A second surface of the first assembly 3100 may be in contact with a first surface of the second assembly 3004, such as a floor, ceiling, or other mounting surface of the aircraft, and a second surface of the second assembly 3004 may be in contact with a first surface of the nut 3005, allowing the securement system 130a to fixably clamp the first assembly 3100 and the second assembly 3004 together.

The first assembly 3100, in some implementations, further includes the mounting hole 3010. The threaded fastener 3001 may be positioned through the mounting hole 3010, and the nut 3005 may be connected to a second, threaded end of the threaded fastener 3001 by a threaded inner diameter of the nut 3005. Located along a length of the threaded fastener 3001 in between the bolt head 3006 and the nut 3005, in the illustrated example, are the bridging washer 3002, the first assembly 3100, and the second assembly 3004 through which the threaded fastener 3001 is positioned.

Because the mounting hole 3010 is larger than a diameter of the threaded fastener 3001, in some implementations, the threaded fastener 3001 may be inserted through the mounting hole 3010, and the mounting position of the first assembly 3100 may be adjusted relative to the second assembly 3004 along an x-axis during assembly or installation of, and prior to tightening of the securement system 130a. The same may also be true of the securement systems 130b-130e illustrated by FIGS. 9-12. The diameter of the mounting hole 3010, for example, may be larger than the diameter of the threaded fastener 3001 by a tolerance amount to allow for adjustment of the mounting position of the first assembly 3100 relative to the second assembly 3004 by up to a maximum adjustment range equal to the tolerance amount. If the mounting hole 3010 has a circular diameter, for example, adjustment in the x-axis may also result in adjustment of the first assembly 3100 relative to the second assembly 3004 in a z-axis perpendicular to the x-y plane shown.

The first assembly 3100 may be secured to the second assembly 3004 by a friction force applied to the contact surface between the internal sleeve 3003 and the second assembly 3004 by a clamping force of the securement system 130a. A friction coefficient may be relatively constant between contact surfaces of the first assembly 3100 and the second assembly 3004, so a friction force between the contact surfaces of the first assembly 3100 and the second assembly 3004 is also approximately proportional to applied pressure. Axial tension within a length of the threaded fastener 3001 between the bolt head 3006 and the nut 3005, distributed over the first surface of the first assembly 3100 by the second side of the bridging washer 3002, and by the nut 3005 to the second side of the second assembly 3004, may provide the clamping force applied to the contact surfaces between the first assembly 3100 and the second assembly 3004. Adjustment of axial tension within the threaded fastener 3001 can be accomplished through tightening or loosening the threaded fastener 3001 relative to the nut 3005, and may provide sufficient friction force to prevent relative movement between the first assembly 3100 and the second assembly 3004.

While the bridging washer 3002 is shown as a tapered washer, in some implementations the bridging washer 3002 has a different shape. For example, the bridging washer may be flat or tapered at a different angle from that shown. Further, a washer may have a different shape to serve different purposes such as to spread a load over a larger area than that of a bolt head, to provide axial springing and prevent loosening due to vibration (spring washers), and to prevent galvanic corrosion between fasteners or parts of dissimilar materials such as steel and aluminum.

In addition to axial loading of the threaded fastener 3001 along a y-axis, the threaded fastener 3001 may also experience shear loading along an x-axis. Shear loading may be experienced, for example, if there is movement between the first assembly 3100 and the second assembly 3004 along an x-axis resulting in a side of the mounting hole 3010 of the first assembly 3100 contacting the threaded fastener 3001 along the length of the threaded fastener 3001. This may occur in case of a crash or a load experienced by the first assembly 3100 exceeds the available friction force provided by the securement system monument attachment system 130 to hold the first assembly 3100 in place with respect to the second assembly 3004.

Figure 9:
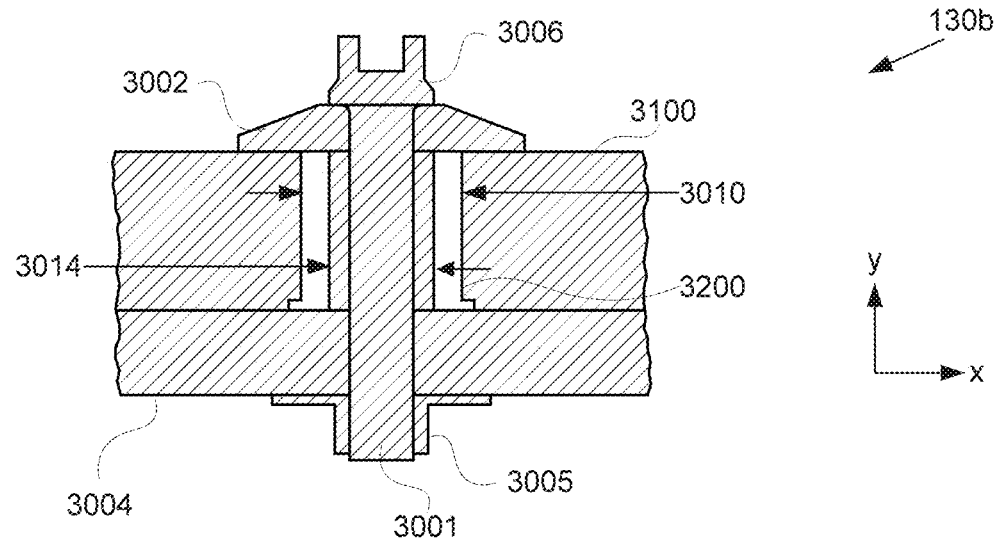

FIG. 9 is a side section view of a securement system 130b, according to an example embodiment. The securement system 130b is identical to the securement system 130a with the exception that the securement system 130b, in some embodiments, also includes a spacer insert 3200. In some implementations, the spacer insert 3200 can include a combination of the internal sleeve 3003 interfacing with the threaded sleeve 3009. In other implementations, the spacer insert 3200 can include the threaded sleeve 3009 configured to engage with the mounting hole 3010. The spacer insert 3200 may be positioned inside the mounting hole 3010 of the first assembly 3100, such as by a press fit or via threads, and the threaded fastener 3001 may be positioned within an inner diameter 3014 of the spacer insert 3200. The inner diameter 3014 may be larger than a diameter of the threaded fastener 3001 to allow both insertion of the threaded fastener 3001 through the inner diameter 3014 of the spacer insert 3200, and to control the amount of tolerance between the threaded fastener 3001 and the spacer insert 3200 along an x-axis.

Additionally, the spacer insert 3200 allows for adjustment of a vertical distance (along a y-axis) between a second side of the first assembly 3100 facing the second assembly 3004 and a first side of the second assembly 3004 facing the second side of the first assembly 3100. This allows vertical placement and positioning between the first assembly 3100 and the second assembly 3004 to be adjusted. The vertical height of the spacer insert 3200 may be determined through selection of a threaded sleeve 3009 of specific vertical height, modification of the threaded sleeve 3009 to the specific vertical height or, if the threaded sleeve 3009 is externally threaded, axially adjusting the position of the threaded sleeve 3009 within the mounting hole 3010 by rotation of the threaded sleeve 3009.

Figure 10:
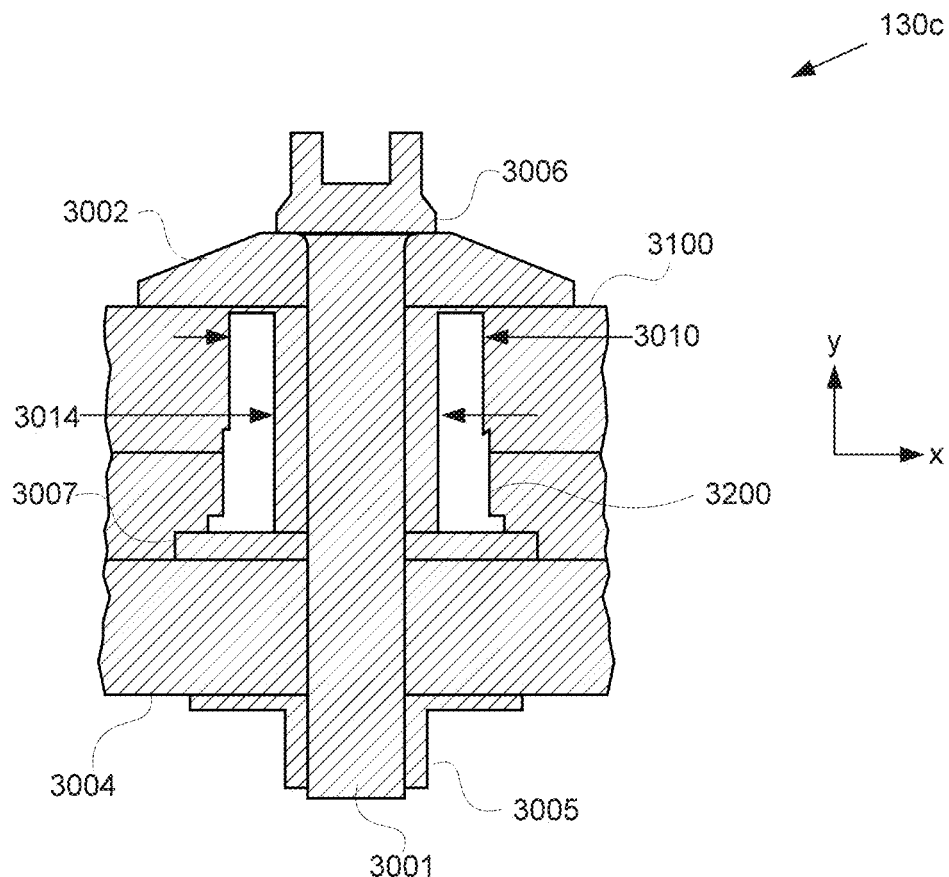

FIG. 10 is a side section view of a securement system 130c, according to an example embodiment. The securement system 130c is identical to the securement system 130b with the exception that the securement system 130c, in some embodiments, also includes the cap spacer 3007 positioned around the threaded fastener 3001 and between the spacer insert 3200 and the second assembly 3004. The cap spacer 3007 may be used to create a desired friction surface to achieve a known friction coefficient on the contact surface between the cap spacer 3007 and the second assembly 3004. Further, in a case where the first assembly 3100 and the second assembly 3004 are formed of different materials, use of the cap spacer 3007 between the spacer insert 3200 and the second assembly 3004 may prevent galvanic corrosion from occurring through separation of dissimilar metals and alloys.

FIG. 11 is a side section view of a securement system 130d, according to an example embodiment. The securement system 130d is identical to the securement system 130c with the exception that the securement system 130d, in some embodiments, also includes a seal 3008. The seal 3008 may be positioned around the cap spacer 3007, at least a portion of the spacer insert 3200, and in contact with the second assembly 3004 such that the cap spacer 3007 may be fully enclosed after installation. Enclosure of the cap spacer 3007 preserves the friction coefficient by preventing contamination of the friction surface by foreign matter where the cap spacer 3007 contacts the second assembly 3004, and where the spacer insert 3200 contacts the cap spacer 3007.

FIG. 12 is a side section view of a securement system 130e, according to an example embodiment. In some implementations, the securement system 130e includes the threaded fastener 3001, the bridging washer 3002, the track fitting 3005b, and the spacer insert 3200. The threaded fastener 3001 may include the bolt head 3006 connected to a first end of the threaded fastener 3001. The bolt head 3006 may be a fixed portion of the first end of the threaded fastener 3001, in which case the bolt head 3006 and the threaded fastener 3001 move together (within an elastic range of stress deformation) when adjusted, or the bolt head 3006 may be a separate component, for example, a nut, that is threaded onto the first end of the threaded fastener 3001.

The bolt head 3006 is in contact at a first end of the threaded fastener 3001 with a first surface of the bridging washer 3002, and a second surface of the bridging washer 3002 is in contact with a first surface of the first assembly 3100. The first assembly 3100 may include a mounting hole 3010. The spacer insert 3200 may be positioned inside the mounting hole 3010, such as by a press fit or via threads, and the threaded fastener 3001 may be positioned within an inner diameter 3014 of the spacer insert 3200. The inner diameter 3014 may be larger than a diameter of the threaded fastener 3001 to allow both insertion of the threaded fastener 3001 through the spacer insert 3200 and to control the amount of tolerance between the threaded fastener 3001 and the spacer insert 3200 along an x-axis. A second surface of the first assembly 3100 is in contact with a first end of the spacer insert 3200, and a second end of the spacer insert 3200 is in contact with a first surface of the cap spacer 3007. A second surface of the cap spacer 3007 is in contact with a first surface of the washer 3012, and a second surface of the washer 3012 is in contact with a first surface of the track fitting 3005b. The track fitting 3005b may be connected to a second, threaded end of the threaded fastener 3001 by a threaded inner diameter of the track fitting 3005b. The track fitting 3005b is positioned within and secured to a track 3020, for example, a rail, a track, or other slot of the aircraft that restrains movement of the track fitting 3005b. Rather than pressing the first assembly 3100 and the second assembly 3004 together as in FIG. 8 through FIG. 11, here the second end of the threaded fastener 3001, and thus the first assembly 3100 is secured to the aircraft by the track fitting 3005b and the track 3020. The pressure applied by tensile loading of the threaded fastener 3001 in a y-axis between the bolt head 3006 and the track fitting 3005b compresses the bridging washer 3002, the first assembly 3100, the spacer insert 3200, the cap spacer 3007, and the washer 3012 together. Because the inner diameter 3014 of the spacer insert 3200 is larger than that of the diameter of the threaded fastener 3001, the first assembly 3100 may be adjusted along an x-axis by the tolerance defined as the difference between the inner diameter 3014 and the diameter of the threaded fastener 3001. The track 3020 may also be shaped to correspond to the shape of the track fitting 3005b where the two contact such that movement of the track fitting 3005b is restricted within the track 3020, allowing securement of the first assembly 3100 to the aircraft.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A system for adjustably mounting a partition of an aircraft monument to a cabin surface, the system comprising:
    a mounting structure fitted within and attached to an edge of the partition abutting the cabin surface, the mounting structure comprising a mounting aperture; and
    a securement apparatus for securing the partition to the cabin surface via the mounting structure, the securement apparatus comprising
        a threaded fastener for extending through the mounting aperture of the mounting structure and through a corresponding opening in a track mounted to the cabin surface,
        a head member for applying rotational force to the threaded fastener, a bridging washer for mating with the mounting aperture, and
        a threaded sleeve;
    wherein, to secure the partition to the cabin surface, the threaded fastener is provided first through the bridging washer, next through the threaded sleeve, and then through the mounting aperture of the mounting structure, wherein, beneath the mounting aperture of the mounting structure, the threaded fastener is threaded to a mating fixture on a bottom side of the track, wherein, upon securing,
        the bridging washer is pressed against the mounting aperture, and
        the head member is secured to an upper side of the bridging washer to fixedly retain the partition to the track;
    and wherein, to adjust a vertical distance between the monument partition and the cabin surface, the threaded sleeve is configured for rotating relative to an internal sleeve fixed to the mounting structure.

2. The system of claim 1, wherein the head member is separable from the threaded fastener.

3. The system of claim 1, wherein the mating fixture on the bottom side of the track is a nut.

4. The system of claim 1, wherein the mounting structure comprises a cover frame configured to releasably accept a cover.

5. The system of claim 4, wherein the mounting structure includes a vertical opening of approximately a height of the threaded fastener and disposed above the mounting aperture, such that the threaded fastener may be positioned within the mounting structure.

6. The system of claim 5, wherein the cover is configured to mask at least a portion of the vertical opening.

7. The system of claim 1, further comprising a seal configured to releasably seal to a seal mating structure provided along a bottom edge of the partition.

8. The system of claim 7, wherein the seal covers at least a portion of a vertical opening in the mounting structure above the mounting aperture, wherein the vertical opening is approximately a height of the threaded fastener.

9. The system of claim 1 wherein rotation of the threaded sleeve relative to the internal sleeve causes adjustment of a clamping or friction force between the mounting structure relative to the track.

10. The system of claim 1, wherein the mounting structure further comprises a second securement apparatus.

11. A method for adjustably mounting a partition of an aircraft monument to a cabin surface, the method comprising:
    providing a mounting structure fitted within and attached to an edge of the partition abutting the cabin surface, the mounting structure comprising a mounting aperture; and
    providing a securement apparatus for securing the partition to the cabin surface via the mounting structure, the securement apparatus comprising
        a threaded fastener for extending through the mounting aperture of the mounting structure and through a corresponding opening in a track mounted to the cabin surface,
        a head member for applying rotational force to the threaded fastener, a bridging washer for mating with the mounting aperture, and
        a threaded sleeve;
    wherein, to secure the partition to the cabin surface, the threaded fastener is provided first through the bridging washer, next through the threaded sleeve, and then through the mounting aperture of the mounting structure, wherein, beneath the mounting aperture of the mounting structure, the threaded fastener is threaded to a mating fixture on a bottom side of the track, wherein, upon securing,
        the bridging washer is pressed against the mounting aperture, and
        the head member is secured to an upper side of the bridging washer to fixedly retain the partition to the track;
    and wherein, to adjust a vertical distance between the monument partition and the cabin surface, the threaded sleeve is configured for rotating relative to an internal sleeve fixed to the mounting structure.

12. The method of claim 11, further comprising placing a floor seal between a base of the monument partition and the cabin surface.

13. The method of claim 11, wherein the securement apparatus further comprises a spacer insert having a threaded sleeve and an internal sleeve, wherein:
    the threaded sleeve is configured to be fitted inside the internal sleeve by a threaded connection; and
    the method further comprises rotating the threaded sleeve relative to the internal sleeve, thereby adjusting a vertical distance between the monument partition and the cabin surface.

14. The method of claim 11, wherein the mounting structure further comprises a cover frame, the method further comprising, after retightening the threaded fastener, attaching a cover to the cover frame.

15. The method of claim 11, wherein the head member is fixed to the threaded fastener.

16. The method of claim 11, further comprising positioning a seal along a bottom edge of the partition, wherein the seal is configured to seal to a seal mating structure provided along the bottom edge of the partition.

17. The method of claim 16, wherein the seal covers at least a portion of a vertical opening in the mounting structure above the mounting aperture, wherein the vertical opening is approximately a height of the threaded fastener.

* * * * *